United States Patent
Hamilton et al.

(10) Patent No.: US 10,223,662 B1
(45) Date of Patent: Mar. 5, 2019

(54) PRODUCT MODEL FILTERED VIEW

(71) Applicant: Guidewire Software, Inc., Foster City, CA (US)

(72) Inventors: Matthew Carl Hamilton, Pacifica, CA (US); Marilyn Joyce Schneider Hollinger, Millbrae, CA (US); Diana Elizabeth Jaffe, Mountain View, CA (US)

(73) Assignee: Guidewire Software, Inc., Foster City, CA (US)

( * ) Notice: Subject to any disclaimer, the term of this patent is extended or adjusted under 35 U.S.C. 154(b) by 667 days.

(21) Appl. No.: 14/272,321

(22) Filed: May 7, 2014

Related U.S. Application Data

(60) Provisional application No. 61/889,433, filed on Oct. 10, 2013.

(51) Int. Cl.
*G06Q 40/08* (2012.01)
*G06Q 10/06* (2012.01)

(52) U.S. Cl.
CPC ........... *G06Q 10/067* (2013.01); *G06Q 40/08* (2013.01)

(58) Field of Classification Search
CPC .............. G06Q 10/067; G06Q 40/08
USPC ............................................. 705/4
See application file for complete search history.

(56) References Cited

U.S. PATENT DOCUMENTS

| | | | | |
|---|---|---|---|---|
| 5,930,512 A | * | 7/1999 | Boden | G06Q 10/06 717/102 |
| 8,650,052 B1 | * | 2/2014 | Anagnoson | G06Q 40/00 705/36 R |
| 2016/0225092 A1 | * | 8/2016 | Le | G06Q 40/08 |

* cited by examiner

*Primary Examiner* — Scott S Trotter
(74) *Attorney, Agent, or Firm* — Van Pelt, Yi & James LLP

(57) ABSTRACT

Generating a filtered view of an insurance product model is disclosed. A master insurance product model comprising a plurality of insurance policy elements is accessed. Each insurance policy element has a set of one or more availability indicators that indicate one or more conditions under which the insurance policy element is available. A specification of a set of filtering criteria specifying at least one value corresponding to at least one of the set of availability indicators is obtained. The master insurance product model is examined using the set of filtering criteria to generate a resulting insurance product model, wherein the resulting insurance product model is used as a basis for generating specific insurance policies. The resulting insurance product model is presented in a display.

21 Claims, 14 Drawing Sheets

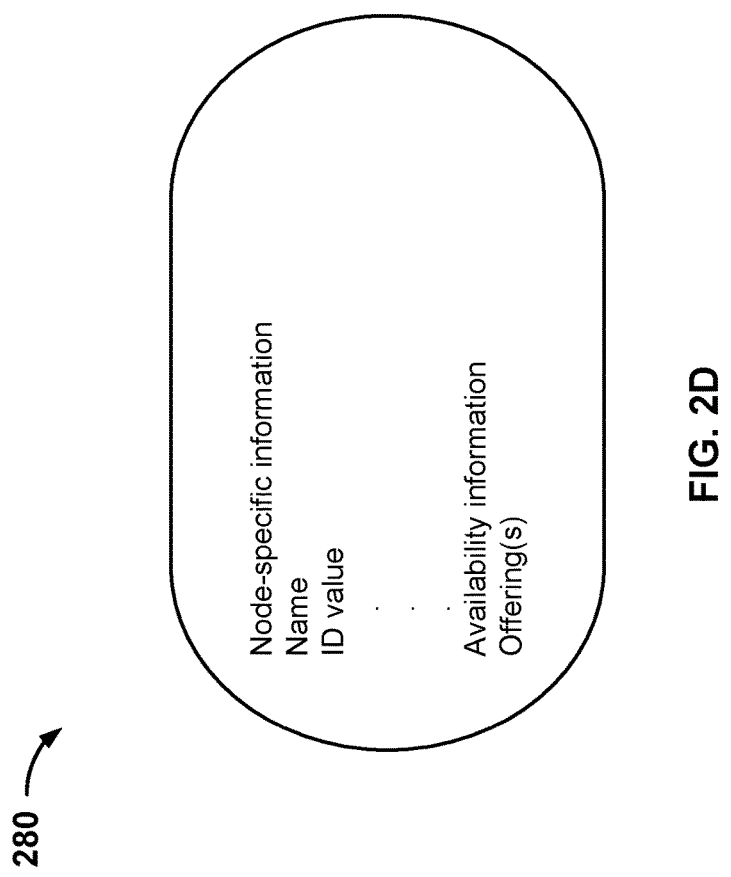

Insurance Product Model

Filtered based on:
State: Kansas
Effective Date: 01/01/2013
Policy Type: Commercial Auto Line
Script A ● Show unavailable
○ Hide unavailable Businessowners Line
Commercial Auto Line
- Categories
- Conditions
- Coverage Symbol Groups
- Coverages
  ○ Audio, Visual, Data Electronic Equipment - Stated Amt.
    ▪ Terms
      ● Audio Visual Data Equipment Deductible
        ○ Options
      ● Audio, Visual, Electronic Equipment
  ○ Auto Dealer Limited Liability
  ○ Bobtail Liability
  ○ Collision
    ▪ Terms
      ● Collision Broadened
      ● Collision Deductible
        ○ Options
          ▪ 1000
          ▪ 1500
          ▪ 3000
          ▪ 4000
          ▪ 5000
          ▪ 500 ← 502
          ▪ No D 504
Not Available Because...
Make Available ○ Collision - Limited Coverage
  ○ Collision - DOC
  ○ Comprehensive

Insurance Product Model

Filtered based on:
State: Kansas
Effective Date: 01/01/2013
Policy Type: Commercial Auto Line
Script A ● Show unavailable
○ Hide unavailable Businessowners Line Commercial Auto Line
- Categories
- Conditions
- Coverage Symbol Groups
- Coverages
  ○ Audio, Visual, Data Electronic Equipment - Stated Amt.
    ▪ Terms
      • Audio Visual Data Equipment Deductible
        ○ Options
      • Audio, Visual, Electronic Equipment
  ○ Auto Dealer Limited Liability
  ○ Bobtail Liability
  ○ Collision
    ▪ Terms
      • Collision Broadened
      • Collision Deductible
        ○ Options
          ▪ 1000
          ▪ 1500
          ▪ 3000
          ▪ 4000
          ▪ 5000
          ▪ 500
          ▪ No D
  ○ Collision - Limited Coverage
  ○ Collision - DOC
  ○ Comprehensive 504 — Not Available Because
Make Available
502 — Coverage Term Option $500 is Only Available in Utah.
602

Insurance Product Model

<u>Filtered based on:</u>
State: Kansas
Effective Date: 01/01/2013
Policy Type: Commercial Auto Line
Script A ○ Show unavailable
● Hide unavailable Commercial Auto Line

- Categories
- Conditions
- Coverage Symbol Groups
- Coverages
    ○ Auto Dealer Limited Liability
    ○ Bobtail Liability
    ○ Collision
        ▪ Terms
            • Collision Broadened
            • Collision Deductible
                ○ Options
                    ▪ 3000
                    ▪ 4000
                    ▪ 5000
    ○ Collision - Limited Coverage
    ○ Collision - DOC
    ○ Comprehensive

FIG. 7

PRODUCT MODEL FILTERED VIEW

CROSS REFERENCE TO OTHER APPLICATIONS

This application claims priority to U.S. Provisional Patent Application No. 61/889,433 entitled PRODUCT MODEL FILTERED VIEW filed Oct. 10, 2013 which is incorporated herein by reference for all purposes.

BACKGROUND OF THE INVENTION

Insurance software is required to manage and store large amounts of insurance related data for a vast array of insurance products and options that may be desired by various customers, e.g., insurance carriers. Some insurance software uses an insurance product model to organize insurance related data. Users may use specialized software to view, create, and make changes to an insurance product model. Such software typically has limited capabilities, particularly in terms of allowing the user to visualize the product model as it is being edited.

BRIEF DESCRIPTION OF THE DRAWINGS

Various embodiments of the invention are disclosed in the following detailed description and the accompanying drawings.

FIG. 2D is a diagram illustrating a node of an insurance product model graph structure.

FIGS. 5-6 are diagrams illustrating an embodiment of a user interface for displaying a filtered insurance product model and a reason an element is not available.

FIG. 7 is a diagram illustrating an embodiment of a user interface for displaying a filtered insurance product model when "Hide unavailable" is selected.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
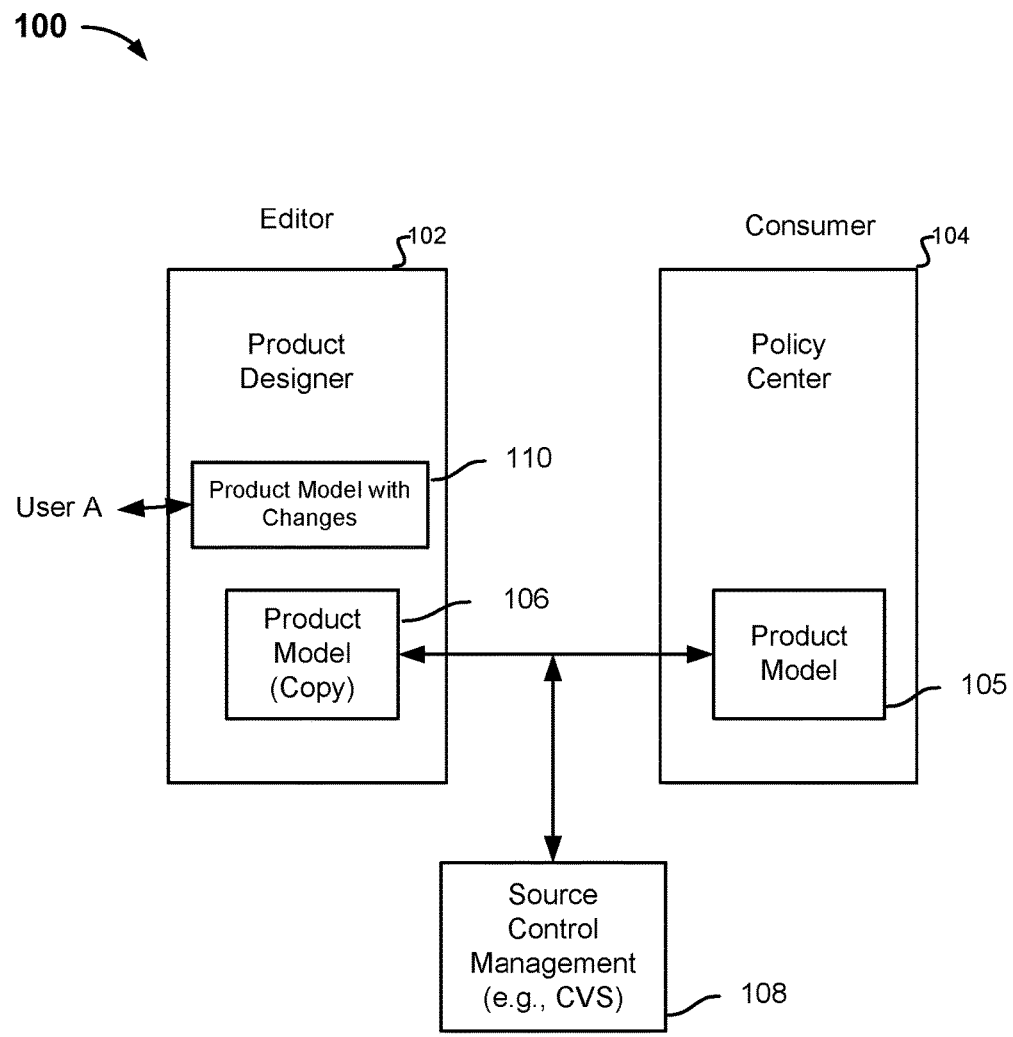
FIG. 1 is a block diagram illustrating an embodiment of a system for generating a filtered view of an insurance product model.

FIG. 1 is a block diagram illustrating an embodiment of a system for generating a filtered view of an insurance product model. In this example, system 100 is shown to include product designer 102, policy center 104, and source control management system 108. Product designer 102 may be used to configure, edit, or design various insurance products and associated information, such as homeowner's insurance or auto insurance, which may include: offerings, availability on policy lines, coverages, coverage terms, conditions, and exclusions. In some embodiments, product designer 102 resides on a separate web server and users can login and use product designer 102 remotely from web browsers running on their laptop or other networked device. Policy center 104 produces instances of these insurance products for individual policies.

In this example, policy center 104 is shown to include product model 105. An insurance product model is a logical representation of insurance products and associated information, e.g., offered by a particular insurance company. In some embodiments, the insurance product model is implemented using XML files and/or stored in a database.

In some embodiments, an insurance product model comprising insurance policy metadata is provided in a computer memory. A computer then serves to substantively interpret this insurance product model to facilitate obtaining supplemental policy-specific data. In some embodiments, an insurance product model refers to metadata that defines the structure of a plurality of derived policies. While the model may contain information that forms part of the information included in the derived policies, it is distinct from, and shared across, all of the derived policies.

The insurance policy metadata may comprise, at least in part, data that defines elements of a corresponding insurance policy. Examples of metadata include, but are not limited to, data that defines policy lines, risk unit types, insurance coverage types, insurance coverage forms, contractual terms associated with insurance coverages ("coverage terms"), options associated with coverage terms, available endorsements, available choices for limits and deductibles, information about the availability of coverages, and so forth.

The supplemental policy-specific data can comprise information such as, but not limited to, actual coverage limits and coverage deductibles selected, coverage elections, risks being covered, a period of coverage, cost(s), applied endorsements, insured entity data, and so forth. By one approach the insurance policy metadata and the supplemental policy-specific data comprise separate and discrete data models and may, if desired, be stored separately from one another.

So configured, the insurance product model and the supplemental policy-specific data can be used to facilitate an insurance-related action. Examples of insurance-related actions include, but are not limited to, creating a new insurance policy, determining whether an insurance policy provides coverage with respect to a particular event, collecting additional information with respect to a particular event, identifying at least one insurance policy that is available to offer to an entity from amongst a plurality of candidate insurance policies, providing information to a user regarding which risk units are permitted to be covered by a given corresponding insurance policy, and so forth (to note but a few examples).

The insurance product model can be used to support managing new policy lines, coverage types, or risk units without requiring reprogramming of a hardcoded policy product embedded in the software code of a policy administration application. Instead, such new information may be incorporated into insurance product model metadata, which metadata is then interpreted and used to collect additional policy-specific information, and which may further facilitate performing an insurance-related action. This, of course, can be accomplished with a great reduction in time and effort and with considerably reduced exposure to coding mishaps.

The insurance policy metadata may comprise, at least in part, data that defines elements of a corresponding insurance policy. The insurance policy metadata may also comprise, at least in part, data that is common to a plurality of derived insurance policies. Examples of metadata include, but are not limited to, data that defines a policy line (that is, a set of related risk types and coverages that, taken together, make up a coherent package of insurance), at least one risk unit type (that is, a thing or circumstance that may be exposed to loss, which may also include, for example, the parameters needed to correctly represent that risk type for purposes of determining coverage and calculating the premium), insurance coverage types (that is, a set of types of available coverage, which may also include, for example, the parameters needed to determine the possible values of limits and deductibles), insurance coverage forms, and so forth.

In addition, the insurance policy metadata may include contractual terms associated with insurance coverages. The contractual terms that can define the insurance policy metadata may comprise coverage limits, coverage deductibles and/or elective coverage options (that is, any configurable option of the coverage (such as, for example, whether a liability coverage includes actions taken by house guests in addition to actions taken by members of the household) that may be selected and may affect the scope of the coverage and the price to be charged). In addition, the insurance policy metadata may also include options associated with coverage terms or an available endorsement. The options associated with coverage terms may comprise a set of available coverage limits and/or available deductibles to choose from. The insurance policy metadata may further comprise information regarding availability of at least one item of insurance policy metadata as a function of at least one of a given jurisdiction, a given date or a given underwriting entity. For example, a specific coverage may only be available in a certain jurisdiction. Therefore, the insurance policy metadata would include information as to the availability of the specific coverage as relates to a plurality of jurisdictions.

The insurance product model may also comprise a multi-line or "package" policy model. For example, the insurance product model can be used to create a plurality of distinct policies by choosing appropriate policy-specific data. As another example, the insurance product model may contain information about multiple lines of coverage, which can then be combined in various ways to make up "package" policies.

Thus, product designer 102 is used to configure and/or design a product model, and policy center 104 uses the product model to construct and issue policies.

In the example shown, product designer 102 is shown to include product model 106, which is a copy of product model 105. In this example, an existing product model 105 is active (i.e., live) and currently in use in the field, and product designer 102 has a copy of product model 105, which can then be copied to individual user's accounts for editing. In this example, product designer 102 is shown to include product model 110, which is a copy of product model 106 and currently being edited by user A.

In some embodiments, source control management 108 manages a master policy center configuration, including one or more master insurance product models. In some embodiments, the master insurance product model is the entire insurance product model without applying any filters. Source control management system 108 is also used to synchronize product model 106 with product model 105. In some embodiments, when product model 106 is updated, source control management system 108 will synchronize those changes to product model 105 at an appropriate point in time.

In some embodiments, source control management 108 is CVS. A user uses product designer 102 to check out product model files from source control management 108, makes some changes (e.g., change list(s) are committed), and then checks the new product model files back in.

Source control management 108 is optional. In some embodiments, synchronizing is done manually. For example, the product designer user interface may include a pull down menu with "Synchronize Product Model" as a selectable option.

In some embodiments, product designer 102 is used to design product model 105 from scratch. For example, product model 106 is built up by one or more users committing one or more change lists to product model 106. Then when product model 106 is complete and/or ready to ship, product model 106 is pushed to policy center 104.

In other embodiments, policy center 104 is shipped with a base version of product model 105 (e.g., a base set of files), and then product designer 102 is used to edit the product model and customize products for that insurance company. Thus, product designer 102 can be used to build out on the base version of a product model.

Figure 2A:
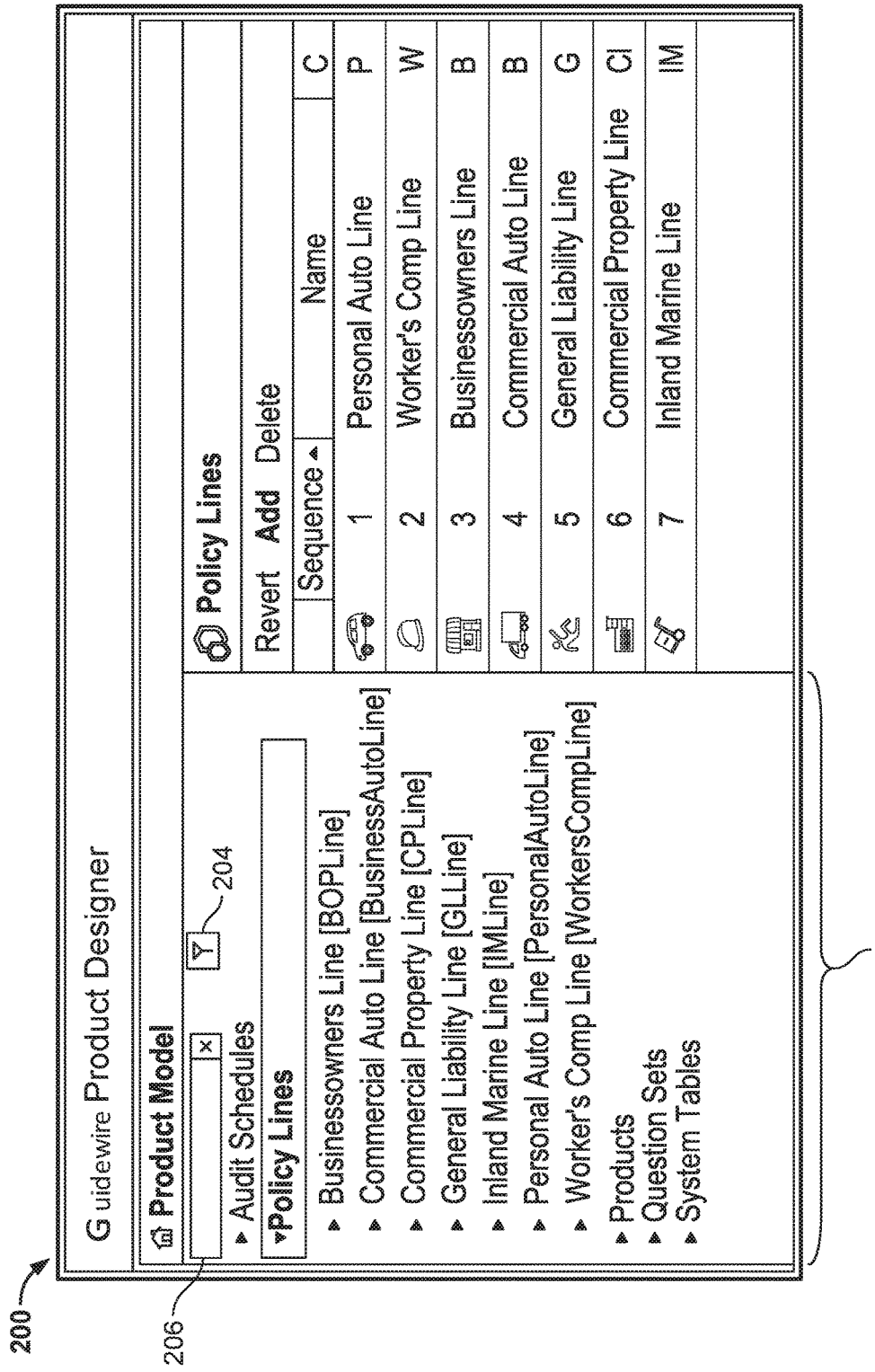
FIG. 2A is a diagram illustrating an embodiment of an interface for editing an insurance product model.

FIG. 2A is a diagram illustrating an embodiment of an interface for editing an insurance product model. When a user logs into product designer 102, the user may be presented with user interface 200. In this example, the left side of user interface 200 includes a panel 202, which displays a navigation tree that a user can navigate through to see all the elements in the insurance product model. Selecting an element in the navigation tree causes information about that item to be displayed on the right hand side for viewing and/or editing. For example, details and/or editable fields associated with that element may be presented on the right hand side. In FIG. 2A, "Policy Lines" is shown as highlighted since that is what is currently selected. As a result, all the available policy lines are displayed on the right hand side.

In panel 202, five sections of an insurance product model are shown, including: audit schedules, policy lines, products, question sets, and system tables. Because "Policy Lines" is selected, all available policy lines are displayed beneath "Policy Lines" in the navigation tree (i.e., Businessowners Line, Commercial Auto Line, Commercial Property Line, General Liability Line, Inland Marine Line, Personal Auto Line, and Workers' Comp Line).

Search box 206 allows the user to search for keywords in the insurance product model. Filter icon 204 allows the user to filter the insurance product model based on filtering criteria, as will be further described below.

Figure 2B:
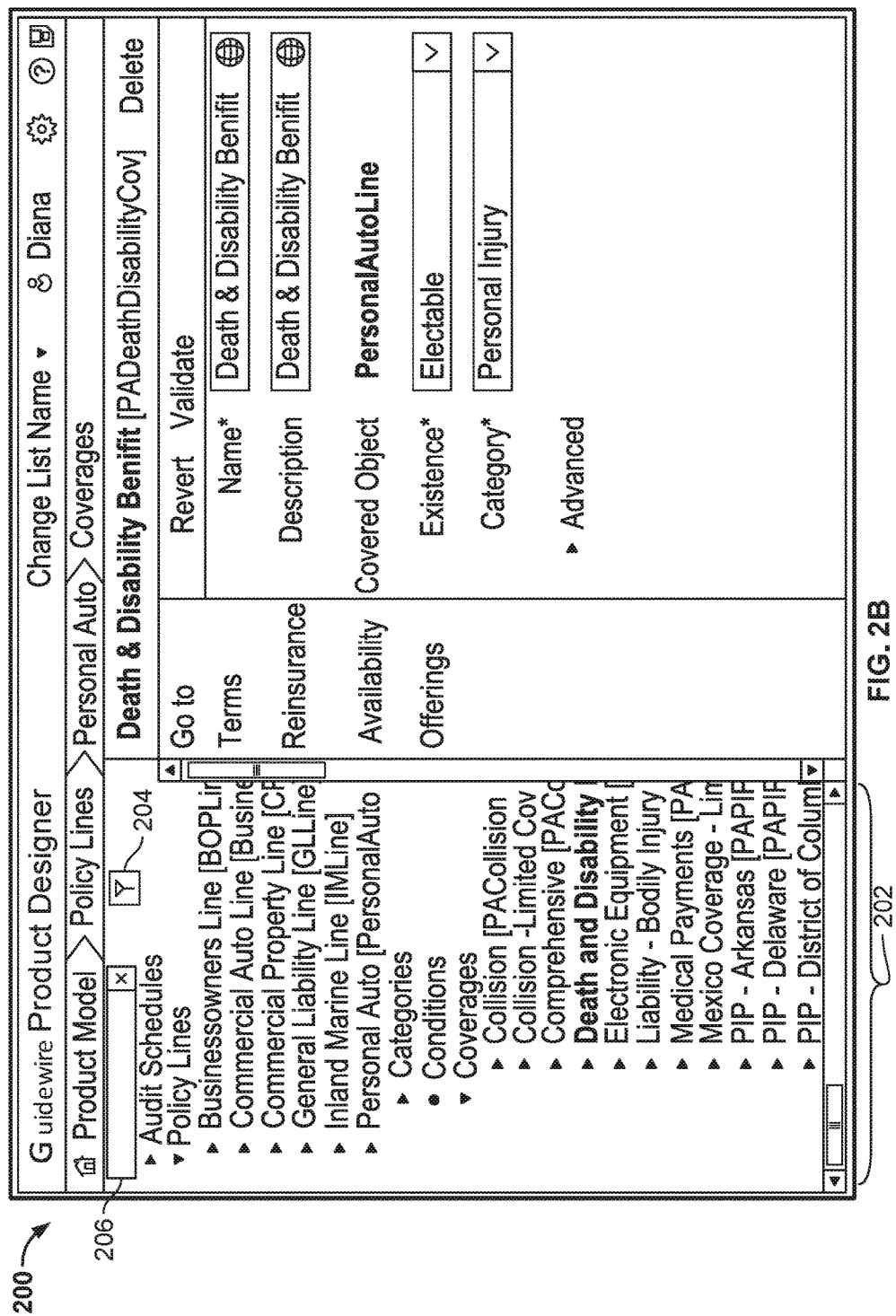
FIG. 2B is a diagram illustrating an embodiment of an interface for editing an insurance product model showing the navigation tree more fully expanded.

FIG. 2B is a diagram illustrating an embodiment of an interface for editing an insurance product model showing the navigation tree more fully expanded. As shown in the navigation tree, "Death & Disability Benefit" is currently selected, which falls under "Coverages," which falls under "Personal Auto," which falls under "Policy Lines."

In some embodiments, the elements in the navigation tree map directly to elements of the insurance product model.

Figure 2C:
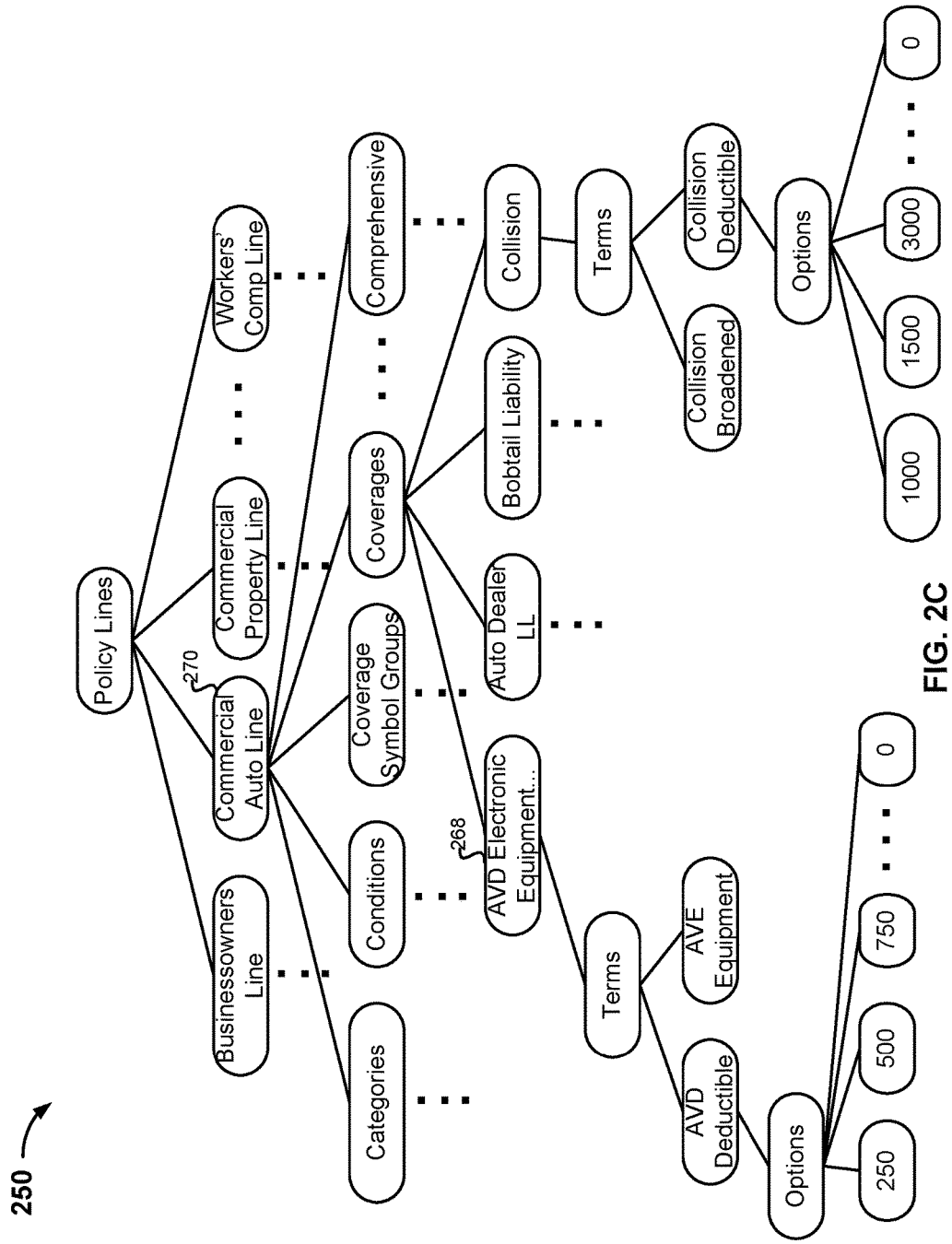
FIG. 2C is a diagram illustrating an insurance product model graph structure.

FIG. 2C is a diagram illustrating an insurance product model graph structure. In this example, an insurance product model is represented using graph structure 250, which is an example of how the insurance product model might be organized and/or stored. Each node in graph structure 250 maps to an element in the insurance product model. (In this figure, the horizontal and vertical ellipses ( . . . ) indicate that there are other nodes in between or following the ellipses.) In some embodiments, each node in graph structure 250 maps to an element in the navigation tree shown in FIGS. 2A-2B.

Each node inherits at least one property of the element to which it is connected above. In some embodiments, each node inherits availability indicators or information from the element above it. For example, all the nodes under Commercial Auto Line 270 are available in a Commercial Auto Line. However, each node may have other availability criteria that are not specified in the node above it, as described more fully below.

FIG. 2D is a diagram illustrating a node of an insurance product model graph structure. In this example, node 280 is an example of one of the nodes shown in graph structure 250. For example, node 280 could be node 268 (AVD Electronic Equipment) in FIG. 2C.

Node 280 is shown to include the following fields: Node-specific information; Name; ID value; Availability information; and Offerings. Availability information could include available state(s), available date(s), policy type(s), effective date(s), line(s) of business, jurisdiction(s), underwriting company(ies), business unit(s), etc. Availability criteria is configurable by the individual customer. Offerings refers to different levels of an insurance product, such as Silver, Gold, and Platinum product offerings. For example, some items may only be available as part of a Platinum product offering. The product offerings for which a node is available would be listed under Offerings. In some embodiments, Offerings is part of Availability information. Availability information and Offerings are both examples of availability indicators, which refers to any field or other data structure that indicates availability information regarding a product or feature associated with a particular node or element in an insurance product model.

Figure 3:
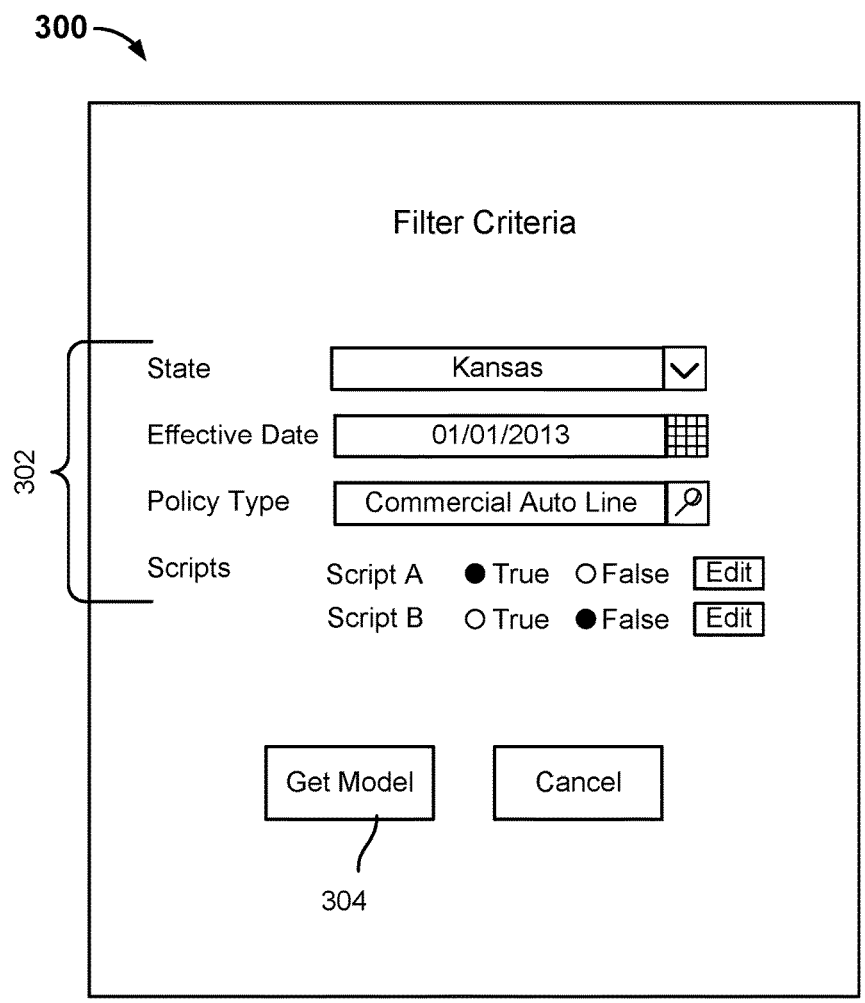
FIG. 3 is a diagram illustrating an embodiment of a user interface for specifying filtering criteria.

For example, node 268 could have the following field values:
Node-specific information field(s)
Name: AVD Electronic Equipment
ID value: 523
Availability information:
Available states: CA; OR
Available dates: CA: Jan. 1, 2013; OR: Jan. 1, 2014
Policy Type: Commercial Auto Line
Offerings: Platinum Product Offering FIG. 3 is a diagram illustrating an embodiment of a user interface for specifying filtering criteria. In some embodiments, filtering user interface 300 is opened in response to a user selecting filter icon 204 (FIGS. 2A-2B). Filtering user interface 300 includes a list of filtering criteria 302. Each filtering criterion specifies at least one value corresponding to at least one of the set of availability indicators in at least one node or field of the insurance product model. In this example, the filtering criteria include: State, Effective Date, Policy Type, and Scripts. State indicates the state in which the element is available. Effective Date indicates the date the element becomes available. Policy Type indicates the type of policy under which the element is available. Note that these three fields directly correspond to the fields in the example node 268 described above.

In some embodiments, rather than or in addition to filtering by what to include (as shown in user interface 300), the user can filter by what to not include, or exclude. For example, user interface 300 could include another section for the user to specify this.

In some embodiments, one or more of the fields in filtering user interface 300 are automatically generated based on the configuration of the insurance product model, e.g., by examining the fields in the various nodes in the insurance product model. In some embodiments, user interface 300 is customizable and the user may specify one or more desired fields to be used in the filtering criteria. In some embodiments, one or more of the most common fields (e.g., state or date) are displayed by default. Therefore, the fields may vary depending on the insurance product model and/or the user.

In this example, the following filtering criteria have been specified:
State: Kansas
Effective Date: Jan. 1, 2013
Policy Type: Commercial Auto Line
Script A: True
Script B: False Scripts may also be provided to specify any other filtering criteria. In this example, such scripts include Script A and Script B. In some embodiments, one or more of the scripts are user customizable, i.e., can be edited by the user by selecting the corresponding "Edit" button. As an example, a user may want to write or edit a script to filter for motorcycle coverage and/or drivers under age 25.

Note that in the example user interface 300, the user can configure or edit a set of options that are available, but not an actual insurance policy itself. The edits made may or may not be committed and/or pushed to a working or live insurance product model. In most cases, the edits are made to a draft version of the insurance product model, such as insurance product model 106 or 110 of FIG. 1. The user is allowed to view different filtered views of a draft insurance product model that the user is currently designing.

After a user inputs the filtering criteria, the user can then select "Get Model" button 304 to cause the filtered insurance product model to be generated and displayed.

Figure 4:
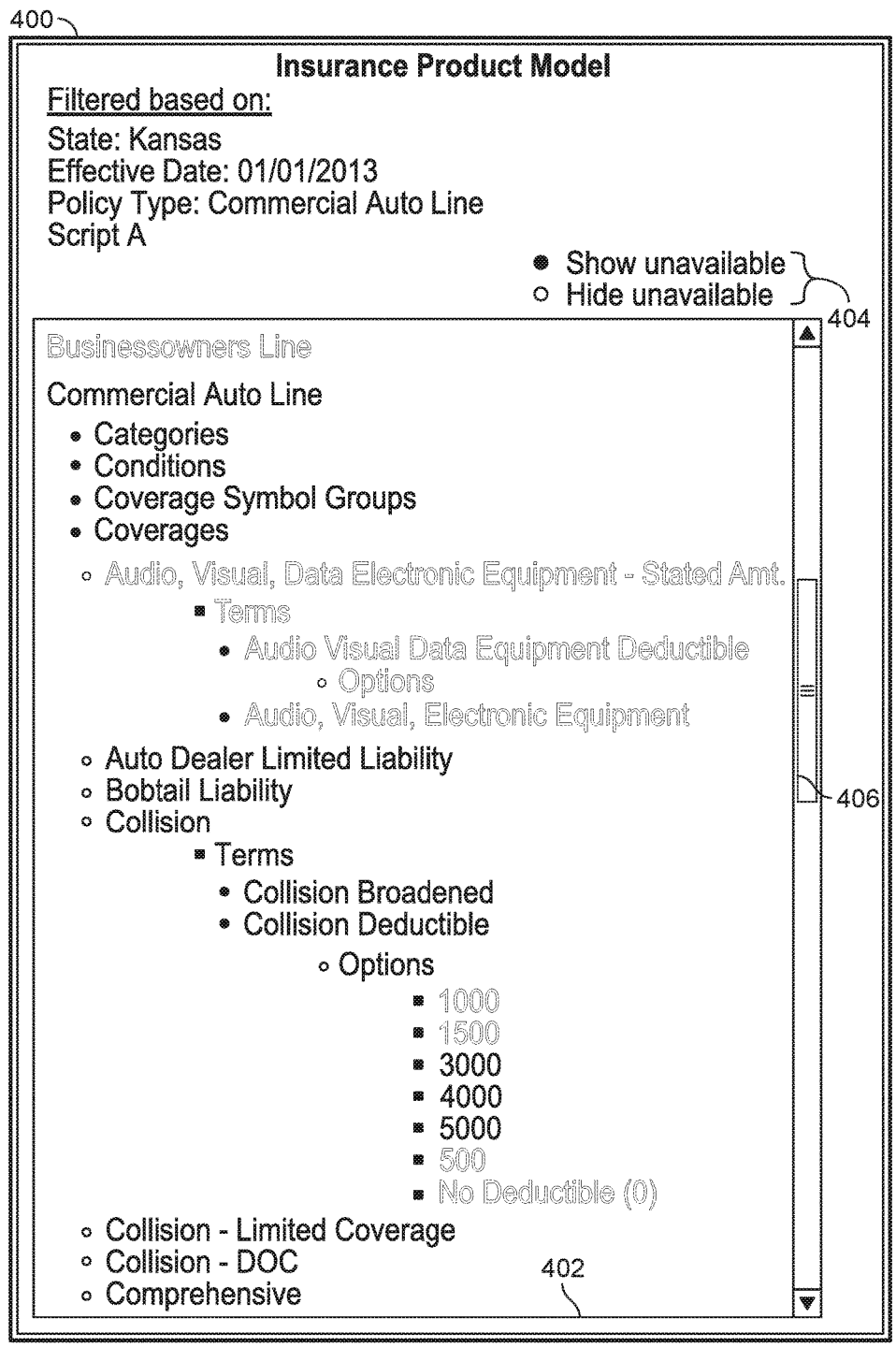
FIG. 4 is a diagram illustrating an embodiment of a user interface for displaying a filtered insurance product model.

FIG. 4 is a diagram illustrating an embodiment of a user interface for displaying a filtered insurance product model. In some embodiments, user interface 400 is opened in response to a user inputting the filtering criteria shown in user interface 300 (FIG. 3) and then selecting "Get Model" button 304 (FIG. 3). Filtering user interface 400 includes (for reference) a list of the filtering criteria under "Filtered based on:" As shown, the filtering criteria in this case are the same as those shown in FIG. 3 (i.e., State: Kansas; Effective Date: Jan. 1, 2013; Policy Type: Commercial Auto Line; Script A: True; and Script B: False).

A scrollable window 402 shows a tree view of the filtered insurance product model. The tree view corresponds to navigation tree 202 of the insurance product model, except that some elements have been filtered out. The elements that have been filtered out are shown in gray: Businessowners Line; Audio, Visual, Data Electronic Equipment—Stated Amt. (and all elements underneath this element); and elements 1000, 1500, 500, and No Deductible (0). Thus, these grayed out elements are not available for one or more of the following reasons: they are not available in Kansas, not effective on Jan. 1, 2013, not available under Commercial Auto Line, and do not meet the criteria specified in Script A. Note that to view the entire filtered insurance product model, scroll bar 406 can be scrolled up or down.

In some embodiments, each element in window 402 is linked back to a specific page related to that element, e.g., to view and/or edit.

Radio buttons 404 provide two options: "Show unavailable" and "Hide unavailable." "Show unavailable" (currently selected) means that unavailable elements are shown in gray. "Hide unavailable" means that unavailable elements are not shown.

As such, the user interfaces shown in FIGS. 3 and 4 may be used to help design and analyze a master insurance product model through looking at different perspectives or filters.

FIGS. 5-6 are diagrams illustrating an embodiment of a user interface for displaying a filtered insurance product model and a reason an element is not available. In this example, a user can hover a mouse cursor 502 over a grayed out element, and a window 504 opens with two options: "Not available because . . . " and "Make Available." When selecting or hovering over "Not available because . . . ," another window 602 opens that displays the reason the element is not available (i.e., why it was filtered out). In this example, the reason is "Coverage Term Option $500 is only available in Utah" and the insurance product model has been filtered based on "State: Kansas."

In some embodiments, the user may edit the insurance product model in this user interface. For example, by selecting "Make Available," the user can cause the $500 option to be made available for the shown filtering criteria. For example, if there is a mistake and the $500 option should be available for the shown filtering criteria, a user may select "Make Available" to correct this.

FIG. 7 is a diagram illustrating an embodiment of a user interface for displaying a filtered insurance product model when "Hide unavailable" is selected. In some embodiments, user interface 700 is displayed in response to a user selecting "Hide unavailable" button 404 (FIG. 4). In some embodiments, user interface 700 is opened in response to a user inputting the filtering criteria shown in user interface 300 (FIG. 3) and then selecting "Get Model" button 304 (FIG. 3).

User interface 700 is similar to user interface 400 except all the previous grayed out elements are no longer displayed because "Hide unavailable" is selected.

Figure 8:
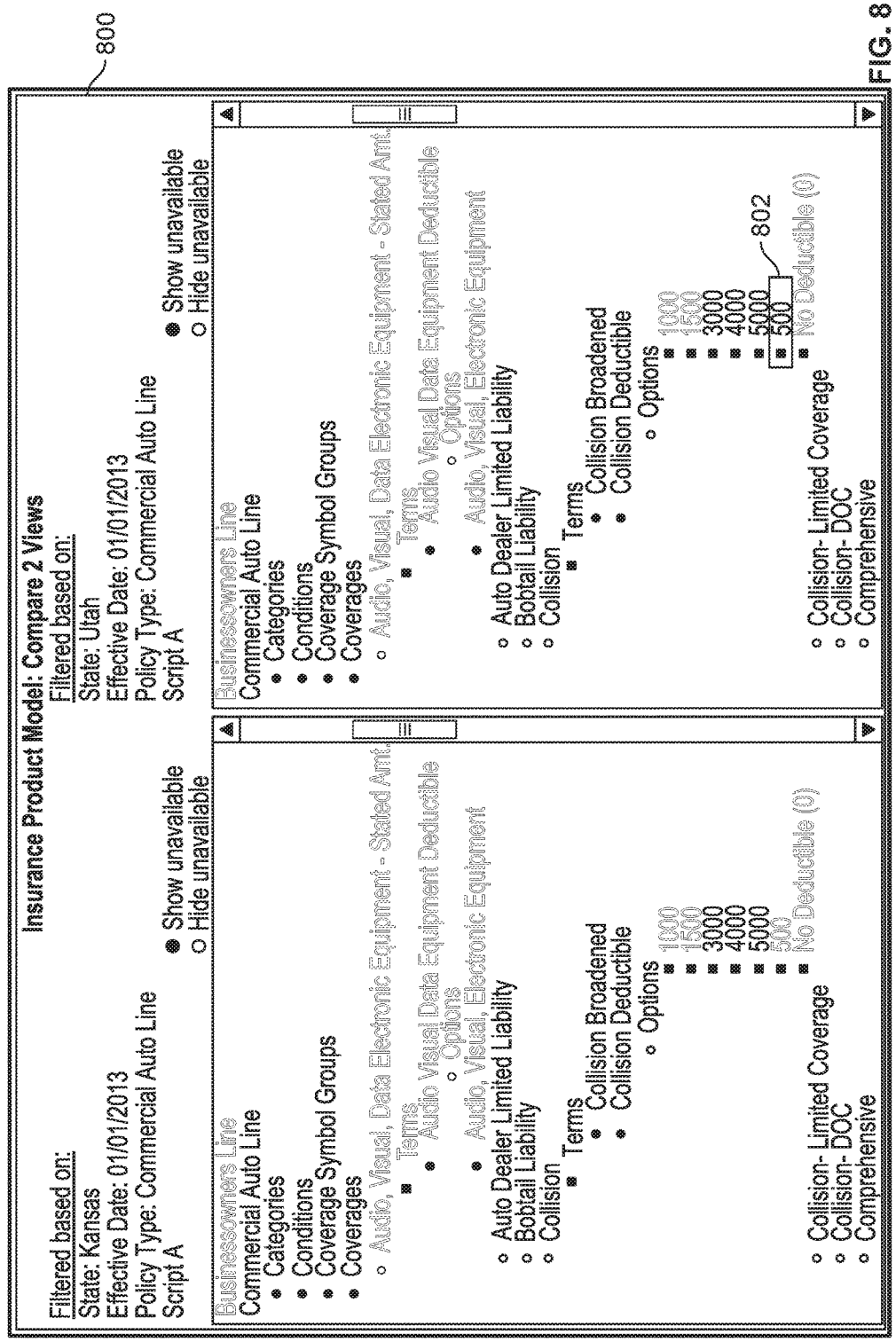
FIG. 8 is a diagram illustrating an embodiment of a user interface 800 for displaying two filtered insurance product models side by side.

FIG. 8 is a diagram illustrating an embodiment of a user interface 800 for displaying two filtered insurance product models side by side. In this example, a side by side view of two filtered insurance product models allows for a direct visual comparison between two filters. For example, if a user wants to compare an insurance product model today versus one year ago, the user may use this feature to help discern the difference. Although user interface 800 shows two filtered insurance product models, in various embodiments, more than two filtered insurance product models are displayed.

As shown, the filtered insurance product model on the left has been filtered by a first filter (State: Kansas; Effective Date: Jan. 1, 2013; Policy Type: Commercial Auto Line; Script A: True; and Script B: False) and the filtered insurance product model on the right has been filtered by a second filter (State: Utah; Effective Date: Jan. 1, 2013; Policy Type: Commercial Auto Line; Script A: True; and Script B: False). A user may, for example, desire to compare these two filtered views because the user is interested in comparing what is available in Kansas vs. Utah.

As shown in this example user interface, the difference between the two filtered insurance product models is boxed (box 802). In Utah, the $500 option is available as a collision deductible under commercial auto line collision coverage, whereas in Kansas this option is not available.

In some embodiments, a user may, in user interface 800, edit the insurance product model. For example, the user may wish for the same collision deductible under commercial auto line collision coverage to be the same in Kansas as in Utah. In some embodiments, the user may right click on box 802 and select an option to edit or make the options the same as the other filtered insurance product model.

Figure 9:
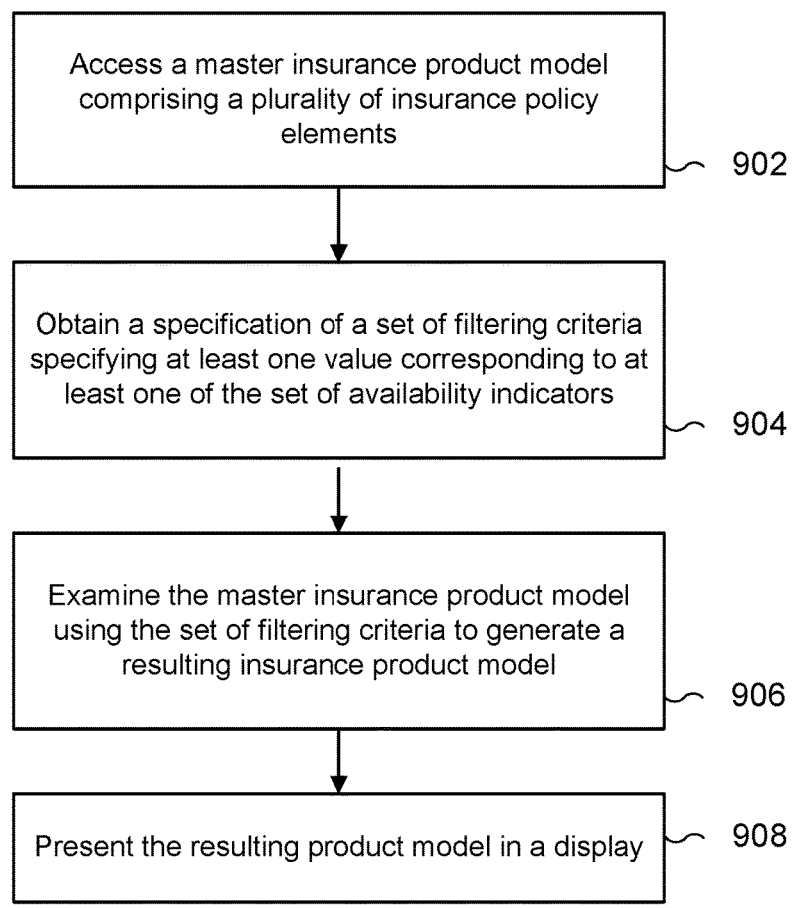
FIG. 9 is a flow chart illustrating an embodiment of a process for generating a filtered view of an insurance product model.

FIG. 9 is a flow chart illustrating an embodiment of a process for generating a filtered view of an insurance product model.

In the example shown, at 902, a master insurance product model comprising a plurality of insurance policy elements is accessed. Each insurance policy element has a set of one or more availability indicators that indicate one or more conditions under which the insurance policy element is available. For example, in system 100, the master insurance product model could be product model 105, 106, or 110. The master insurance product model could be the insurance product model shown in FIG. 2C. Each node in FIG. 2C represents an insurance policy element. In node 280 (FIG. 2D), availability indicators could include "Availability information" and/or "Offerings."

At 904, a specification of a set of filtering criteria specifying at least one value corresponding to at least one of the set of availability indicators is obtained. For example, in user interface 300, the filtering criteria could include one or more of: state, effective date, policy type, and one or more scripts (each of which may specify one or more additional filtering criteria).

At 906, the master insurance product model is examined (e.g., filtering) using the set of filtering criteria to generate a resulting insurance product model. In some embodiments, filtering may be performed by winnowing down a tree, such as graph structure 250 of FIG. 2C. In some embodiments, filtering can be performed by filtering the nodes (e.g., searching the availability information in the nodes for the state of Kansas).

For example, in user interface 400, the filtered insurance product model shown in window 402 could be the resulting insurance product model.

The resulting insurance product model is used as a basis for generating specific insurance policies. For example, in user interface 400, the filtered insurance product model shown in window 402 could be used as a basis for generating commercial auto line insurance policies for customers in Kansas with an effective date of Jan. 1, 2013 and the availability criteria specified in Script A.

At 908, the resulting insurance product model is presented in a display. Examples of displays include user interfaces 400, 700, and 800.

Figure 10:
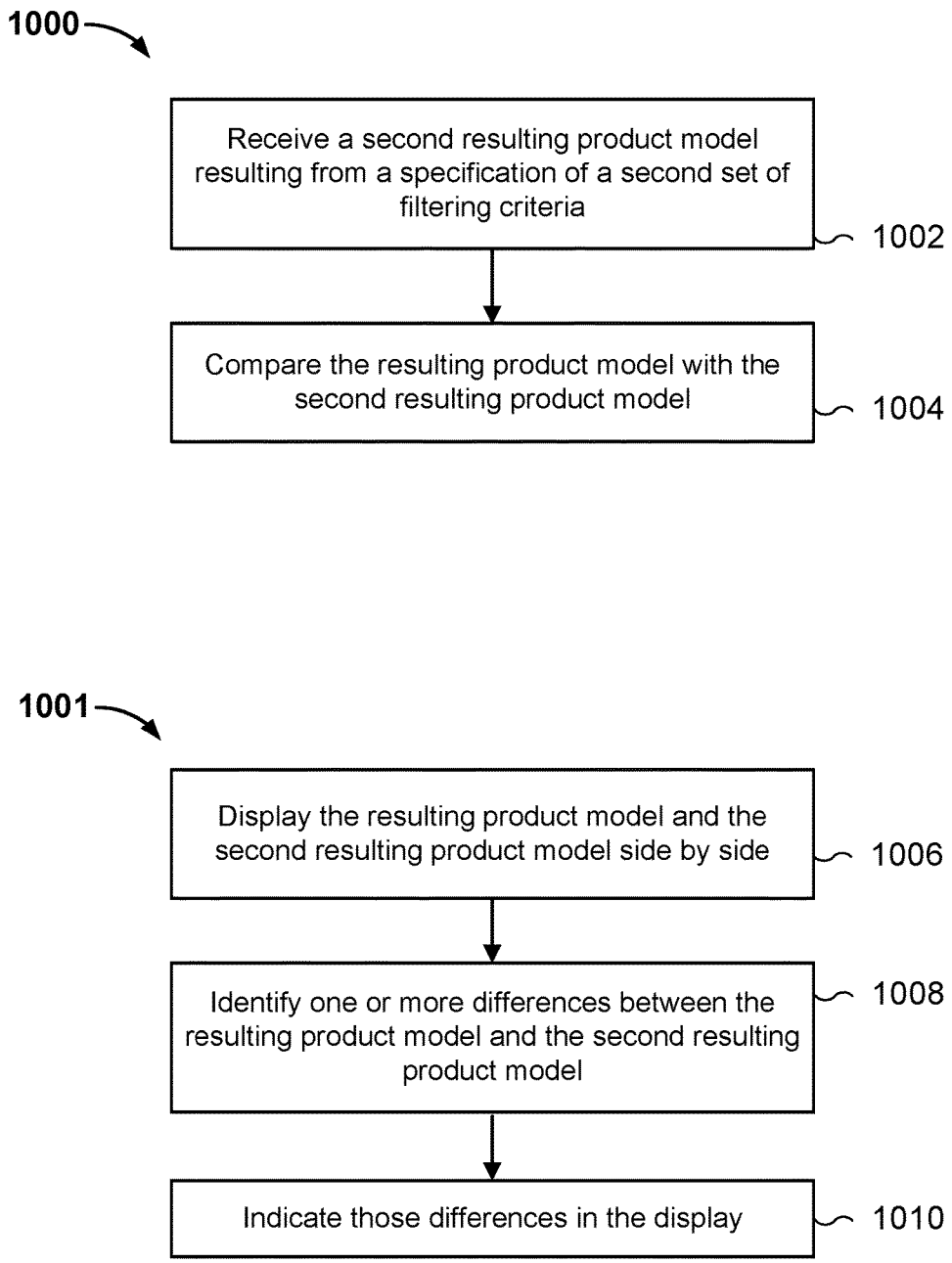
FIG. 10 includes flow charts illustrating some embodiments of a process for comparing two or more filtered insurance product models.

FIG. 10 includes flow charts illustrating some embodiments of a process for comparing two or more filtered insurance product models. In some embodiments, process 1000 is performed after 906.

At 1002, a second resulting product model resulting from a specification of a second set of filtering criteria is received. For example, 904-908 are performed again for a second set of filtering criteria. For example, the first set of filtering criteria could be:
  State: Kansas;
  Effective Date: Jan. 1, 2013;
  Policy Type: Commercial Auto Line;
  Script A: True; and
  Script B: False.
The second set of filtering criteria could be:
  State: Utah;
  Effective Date: Jan. 1, 2013;
  Policy Type: Commercial Auto Line;
  Script A: True; and
  Script B: False.

At 1004, the resulting product model is compared with the second resulting product model. For example, user interface 800 shows the two resulting insurance product models filtered based on the first and second sets of filtering criteria described above.

In some embodiments, process 1001 is used to perform 1004.

At 1006, the resulting product model and the second resulting product model are displayed side by side. User interface 800 shows the two resulting insurance product models displayed side by side.

At 1008, one or more differences between the resulting product model and the second resulting product model are identified. For example, the two resulting insurance product models are analyzed for their differences.

At 1010, those differences are indicated in the display. For example, in user interface 800, a box is drawn around the item that is available in the second resulting insurance product model and not the available in the first resulting insurance product model. In various embodiments, the differences may be indicated in various ways. For example, there could be a bullet drawn next to the different items or color (e.g., different colored text) could be used to indicate differences.

Figure 11:
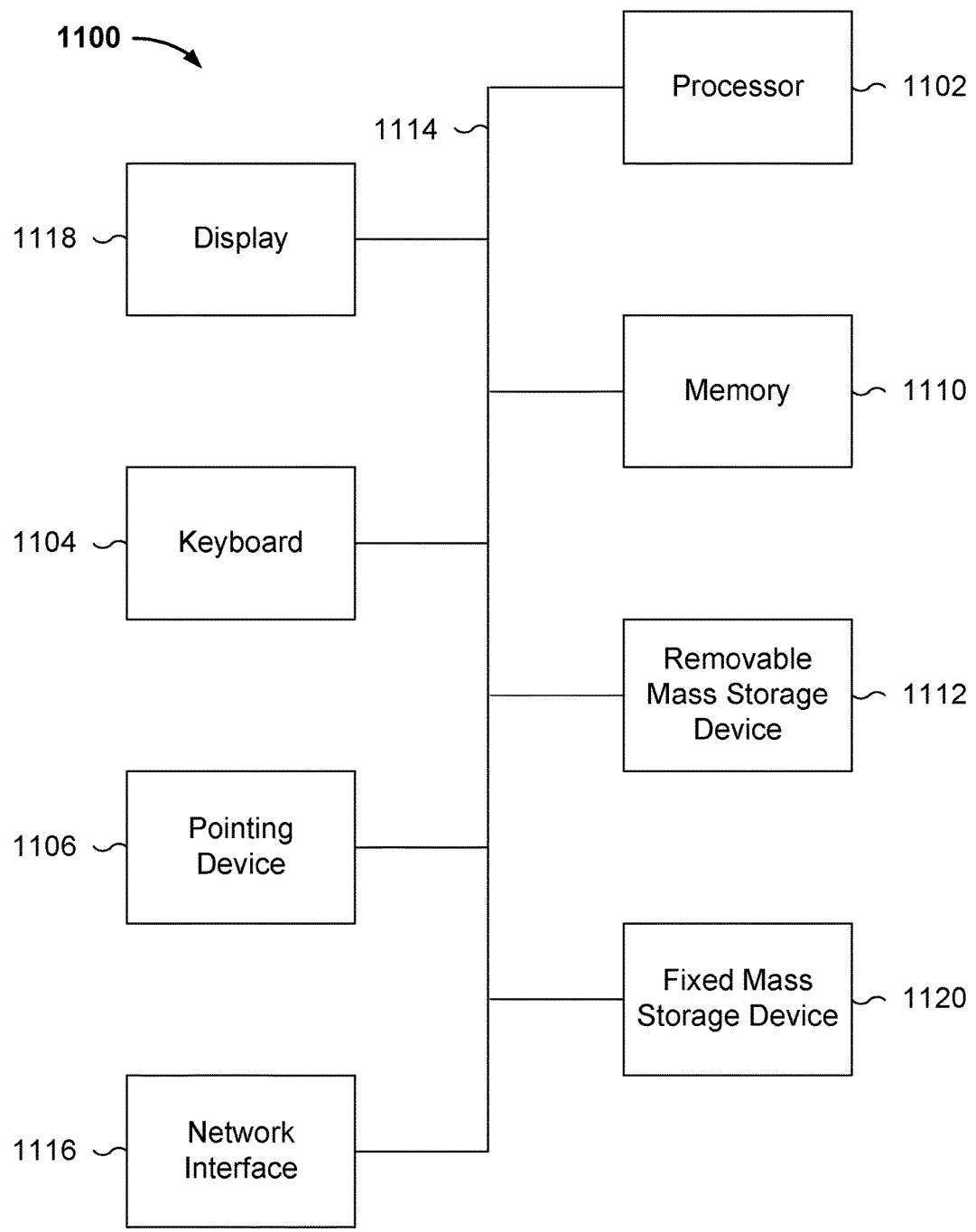
FIG. 11 is a functional diagram illustrating a programmed computer system for generating a filtered view of an insurance product model in accordance with some embodiments.

FIG. 11 is a functional diagram illustrating a programmed computer system for generating a filtered view of an insurance product model in accordance with some embodiments. As will be apparent, other computer system architectures and configurations can be used to generate a filtered view of an insurance product model. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118). In some embodiments, processor 1102 includes and/or is used to provide product designer 102 and/or policy center 104 described below with respect to FIG. 1 and/or executes/performs the processes described below with respect to FIGS. 9-10.

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer-readable storage media, described below, depending on whether, for example, data access needs to be bi-directional or uni-directional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or uni-directionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storage 1112, 1120 generally store additional programming instructions, data, and the like that typically are not in active use by the processor 1102. It will be appreciated that the information retained within mass storage 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

Generating a filtered view of an insurance product model has been described. The filtered view increases the capabilities and functionality of the product designer, particularly in terms of allowing the user to visualize the various options available to different market segments as the insurance product model is being edited.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
access a master insurance product model comprising insurance policy metadata, wherein the insurance policy metadata defines a plurality of insurance policy elements, and wherein the insurance policy metadata includes availability indicators that indicate conditions under which the insurance policy elements are available;
obtain a specification of a set of customized filtering criteria specifying at least one value corresponding to at least one of the availability indicators;
examine the master insurance product model using the set of customized filtering criteria and the insurance policy metadata to generate, from the master insurance product model, a resulting insurance product model, wherein the resulting insurance product model is used to generate specific insurance policies, and wherein an element is unavailable in the resulting insurance product model based at least in part on the set of customized filtering criteria;
present the resulting insurance product model in a user interface, including to display the unavailable element in the user interface; and
display a reason the element is unavailable in response to a user interaction with the unavailable element; and
one or more memories coupled to the one or more processors and configured to provide the one or more processors with instructions.

2. The system recited in claim 1, wherein the availability indicators comprise fields in insurance policy elements.

3. The system recited in claim 1, wherein the availability indicators comprise one or more of: available state(s), available date(s), policy type(s), effective date(s), line(s) of business, jurisdiction(s), underwriting company(ies), business unit(s), and offering(s).

4. The system recited in claim 1, wherein the master insurance product model is represented using a graph structure.

5. The system of claim 4, wherein each node in the graph structure maps to an insurance policy element, wherein a node includes one or more availability indicators, and wherein generating the resulting insurance product model includes filtering the nodes in the graph structure at least in part by searching availability indicators in the nodes of the graph structure based at least in part on the set of customized filtering criteria.

6. The system recited in claim 4, wherein in the graph structure, each node inherits an availability indicator from a node above it.

7. The system recited in claim 1, wherein the one or more processors are further configured to select the master insurance product model from a plurality of master insurance product models.

8. The system recited in claim 1, wherein the set of customized filtering criteria is specified in a filtering user interface whose fields are automatically generated.

9. The system recited in claim 1, wherein the set of customized filtering criteria is specified in a filtering user interface whose fields are user configurable.

10. The system recited in claim 1, wherein the set of customized filtering criteria is specified in a filtering user interface that allows selecting one or more scripts that specify filtering criteria.

11. The system recited in claim 10, wherein the scripts are user customizable.

12. The system recited in claim 1, wherein the user interface includes an option to show or hide elements that are unavailable under the set of customized filtering criteria.

13. The system recited in claim 1, wherein the one or more processors are further configured to receive, via the user interface, a user input to indicate that an element should be made available under the set of customized filtering criteria.

14. The system recited in claim 1, wherein the one or more processors are further configured to receive a second resulting insurance product model resulting from a specification of a second set of filtering criteria.

15. The system recited in claim 14, wherein the one or more processors are further configured to compare the resulting insurance product model with the second resulting insurance product model.

16. The system recited in claim 15, wherein comparing includes displaying the resulting insurance product model and the second resulting insurance product model side by side.

17. The system recited in claim 15, wherein comparing includes identifying one or more differences between the resulting insurance product model and the second resulting insurance product model and indicating the one or more differences in the user interface.

18. The system recited in claim 17, wherein the one or more processors are further configured to receive, via the user interface, a user input to remove the differences and make options the same in the master insurance product model.

19. A method, comprising:
  accessing a master insurance product model comprising insurance policy metadata, wherein the insurance policy metadata defines a plurality of insurance policy elements, and wherein the insurance policy metadata includes availability indicators that indicate one or more conditions under which the insurance policy elements are available;
  obtaining a specification of a set of customized filtering criteria specifying at least one value corresponding to at least one of the availability indicators;
  examining the master insurance product model using the set of customized filtering criteria and the insurance policy metadata to generate, from the master insurance product model, a resulting insurance product model, wherein the resulting insurance product model is used as a basis for generating specific insurance policies, and wherein an element is unavailable in the resulting insurance product model based at least in part on the set of customized filtering criteria;
  presenting the resulting insurance product model in a user interface, including to display the unavailable element in the user interface; and
  displaying a reason the element is unavailable in response to a user interaction with the unavailable element.

20. A computer program product embodied in a non-transitory computer readable storage medium and comprising computer instructions for:
  accessing a master insurance product model comprising insurance policy metadata, wherein the insurance policy metadata defines a plurality of insurance policy elements, and wherein the insurance policy metadata includes availability indicators that indicate conditions under which the insurance policy elements are available;
  obtaining a specification of a set of customized filtering criteria specifying at least one value corresponding to at least one of the availability indicators;
  examining the master insurance product model using the set of customized filtering criteria and the insurance policy metadata to generate, from the master insurance product model, a resulting insurance product model, wherein the resulting insurance product model is used as a basis for generating specific insurance policies, and wherein an element is unavailable in the resulting insurance product model based at least in part on the set of customized filtering criteria;
  presenting the resulting insurance product model in a user interface, including to display the unavailable element in the user interface; and
  displaying a reason the element is unavailable in response to a user interaction with the unavailable element.

21. A system, comprising:
  one or more processors configured to:
    access a master insurance product model comprising insurance policy metadata, wherein the insurance policy metadata defines a plurality of insurance policy elements, and wherein the insurance policy metadata includes availability indicators that indicate conditions under which the insurance policy elements are available;
    obtain a specification of a set of customized filtering criteria specifying at least one value corresponding to at least one of the availability indicators;
    examine the master insurance product model using the set of customized filtering criteria and the insurance policy metadata to generate, from the master insurance product model, a first resulting insurance product model, wherein the first resulting insurance product model is used to generate specific insurance policies;
    receive a second resulting insurance product model resulting from a specification of a second set of filtering criteria;
    identify a difference between the first resulting insurance product model and the second resulting insurance product model, wherein the difference comprises an element that is available in the second resulting insurance product model and is unavailable in the first resulting insurance product model; and
    present the first resulting insurance product model and the second resulting insurance product model in a user interface, wherein the element that is available in the second resulting insurance product model and is unavailable in the first resulting insurance product model is indicated in the user interface; and
  one or more memories coupled to the one or more processors and configured to provide the one or more processors with instructions.

* * * * *